United States Patent

Hollingsworth et al.

Patent Number: 6,023,382
Date of Patent: Feb. 8, 2000

[54] PORTABLE UNDERWATER VIEWER WITH MAGNIFYING CAPABILITIES

[76] Inventors: Donald R. Hollingsworth; Chester W. Champion, both of 2772 Rio Linda Blvd., Sacramento, Calif. 95815

[21] Appl. No.: 09/086,441

[22] Filed: May 28, 1998

[51] Int. Cl.[7] .................. G02B 5/00; G02B 7/02
[52] U.S. Cl. ................ 359/895; 359/440; 359/809
[58] Field of Search .................. 359/436, 440–442, 359/507–512, 798–812, 894, 895, 900; 428/422; 264/25; 84/377, 379

[56] References Cited

U.S. PATENT DOCUMENTS

| | | | |
|---|---|---|---|
| 2,404,556 | 7/1946 | Wirth | 359/895 |
| 2,730,921 | 1/1956 | Little | 359/895 |
| 2,795,165 | 6/1957 | Vernier | 359/895 |
| 2,911,878 | 11/1959 | Vernier | 359/895 |
| 3,628,853 | 12/1971 | Stoscup | 359/895 |
| 5,491,589 | 2/1996 | Haymond | 359/895 |

FOREIGN PATENT DOCUMENTS

| | | | |
|---|---|---|---|
| 367991 | 1/1923 | Germany | 84/379 |

*Primary Examiner*—Thong Nguyen

[57] ABSTRACT

An underwater viewing apparatus is provided including a housing with a hollow configuration. Also included is a lens assembly comprising a magnifying lens secured within the housing for magnifying items beneath the housing when viewed through the housing.

5 Claims, 2 Drawing Sheets

PORTABLE UNDERWATER VIEWER WITH MAGNIFYING CAPABILITIES

BACKGROUND OF THE INVENTION

1. Field of the Invention

The present invention relates to underwater viewers and more particularly pertains to a new portable underwater viewer with magnifying capabilities for locating items underwater.

2. Description of the Prior Art

The use of underwater viewers is known in the prior art. More specifically, underwater viewers heretofore devised and utilized are known to consist basically of familiar, expected and obvious structural configurations, notwithstanding the myriad of designs encompassed by the crowded prior art which have been developed for the fulfillment of countless objectives and requirements.

Known prior art underwater viewers include U.S. Pat. No. 4,895,539; U.S. Pat. No. 4,145,783; U.S. Pat. No. 2,717,399; U.S. Pat. No. 4,465,468; U.S. Pat. No. 3,081,726; and U.S. Pat. No. 4,553,819.

In these respects, the portable underwater viewer with magnifying capabilities according to the present invention substantially departs from the conventional concepts and designs of the prior art, and in so doing provides an apparatus primarily developed for the purpose of locating items underwater.

SUMMARY OF THE INVENTION

In view of the foregoing disadvantages inherent in the known types of underwater viewers now present in the prior art, the present invention provides a new portable underwater viewer with magnifying capabilities construction wherein the same can be utilized for locating items underwater.

The general purpose of the present invention, which will be described subsequently in greater detail, is to provide a new portable underwater viewer with magnifying capabilities apparatus and method which has many of the advantages of the underwater viewers mentioned heretofore and many novel features that result in a new portable underwater viewer with magnifying capabilities which is not anticipated, rendered obvious, suggested, or even implied by any of the prior art underwater viewers, either alone or in any combination thereof.

To attain this, the present invention generally comprises a housing with a hollow cylindrical configuration. As shown in the figures, the housing has an intermediate extent with a first diameter along a length thereof. Further, the housing is equipped with a top extent and a bottom extent both with a diameter greater than that of the intermediate extent. For reasons that will soon become apparent, a black lining is situated along an entire inner surface of the housing. A lens assembly is provided including a pair of rings mounted within the inner surface of the bottom extent of the housing in spaced coaxial relationship. A magnifying lens is secured between the rings for magnifying items beneath the housing when viewed through the housing. The black lining prevents glare from interfering with the viewing of items below the housing. For venting air trapped within the bottom extent, a hole is formed in the bottom extent of the housing just beneath the magnifying lens. Finally, a pair of handle assemblies include a pair of vertical posts boltedly coupled to diametrically opposed sides of the top extent of the housing. The handle assemblies further include a pair of elbows each having a bottom portion swivelably secured to an associated one of the vertical posts. A pair of hollow, hermetically sealed horizontal posts are each coupled to a top portion of the corresponding elbow.

It is therefore an object of the present invention to provide a new portable underwater viewer with magnifying capabilities apparatus and method which has many of the advantages of the underwater viewers mentioned heretofore and many novel features that result in a new portable underwater viewer with magnifying capabilities which is not anticipated, rendered obvious, suggested, or even implied by any of the prior art underwater viewers, either alone or in any combination thereof.

It is another object of the present invention to provide a new portable underwater viewer with magnifying capabilities which may be easily and efficiently manufactured and marketed.

It is a further object of the present invention to provide a new portable underwater viewer with magnifying capabilities which is of a durable and reliable construction.

An even further object of the present invention is to provide a new portable underwater viewer with magnifying capabilities which is susceptible of a low cost of manufacture with regard to both materials and labor, and which accordingly is then susceptible of low prices of sale to the consuming public, thereby making such portable underwater viewer with magnifying capabilities economically available to the buying public.

Still yet another object of the present invention is to provide a new portable underwater viewer with magnifying capabilities which provides in the apparatuses and methods of the prior art some of the advantages thereof, while simultaneously overcoming some of the disadvantages normally associated therewith.

Still another object of the present invention is to provide a new portable underwater viewer with magnifying capabilities for locating items underwater.

Even still another object of the present invention is to provide a new portable underwater viewer with magnifying capabilities that includes a housing with a hollow configuration. Also included is a lens assembly comprising a magnifying lens secured within the housing for magnifying items beneath the housing when viewed through the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
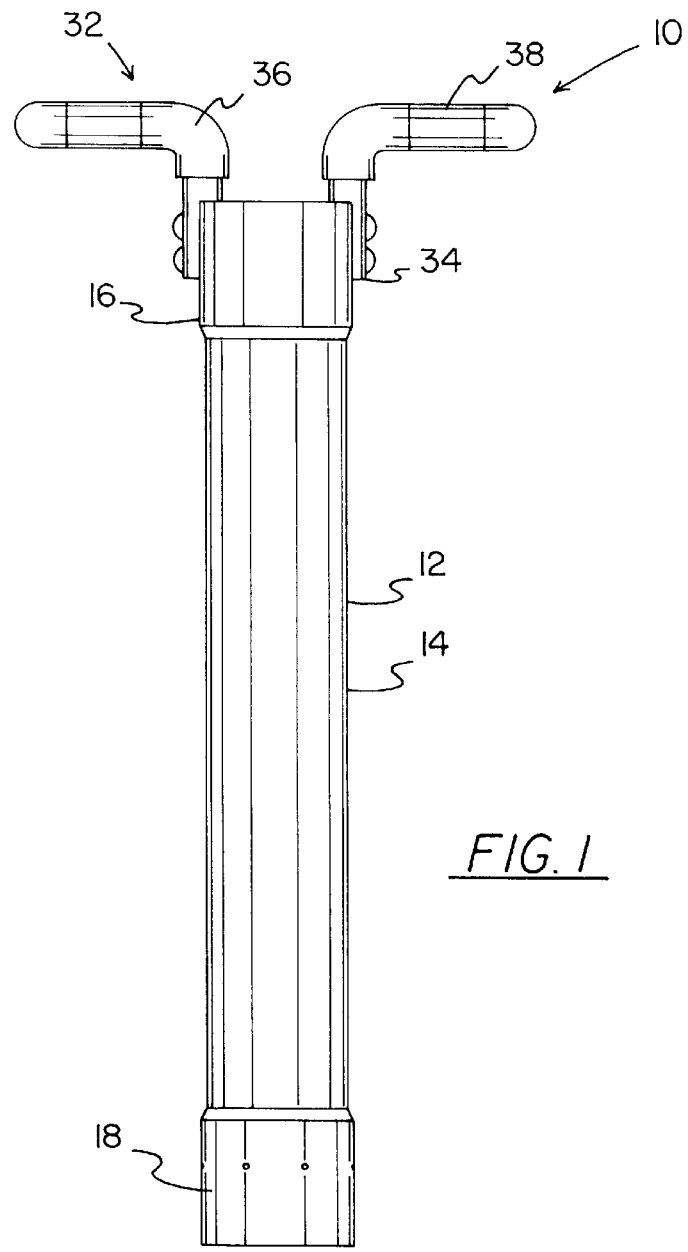
FIG. 1 is a side view of a new portable underwater viewer with magnifying capabilities according to the present invention.
Figure 2:
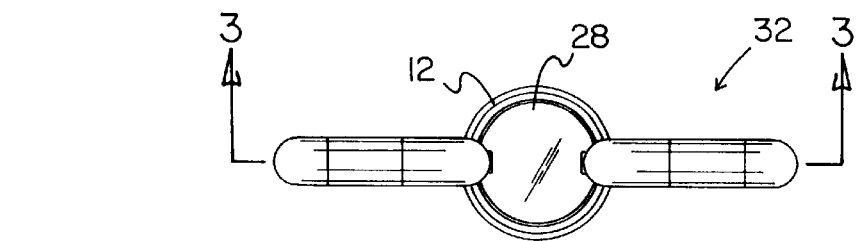
FIG. 2 is a top view of the present invention showing the handles thereof.
Figure 3:
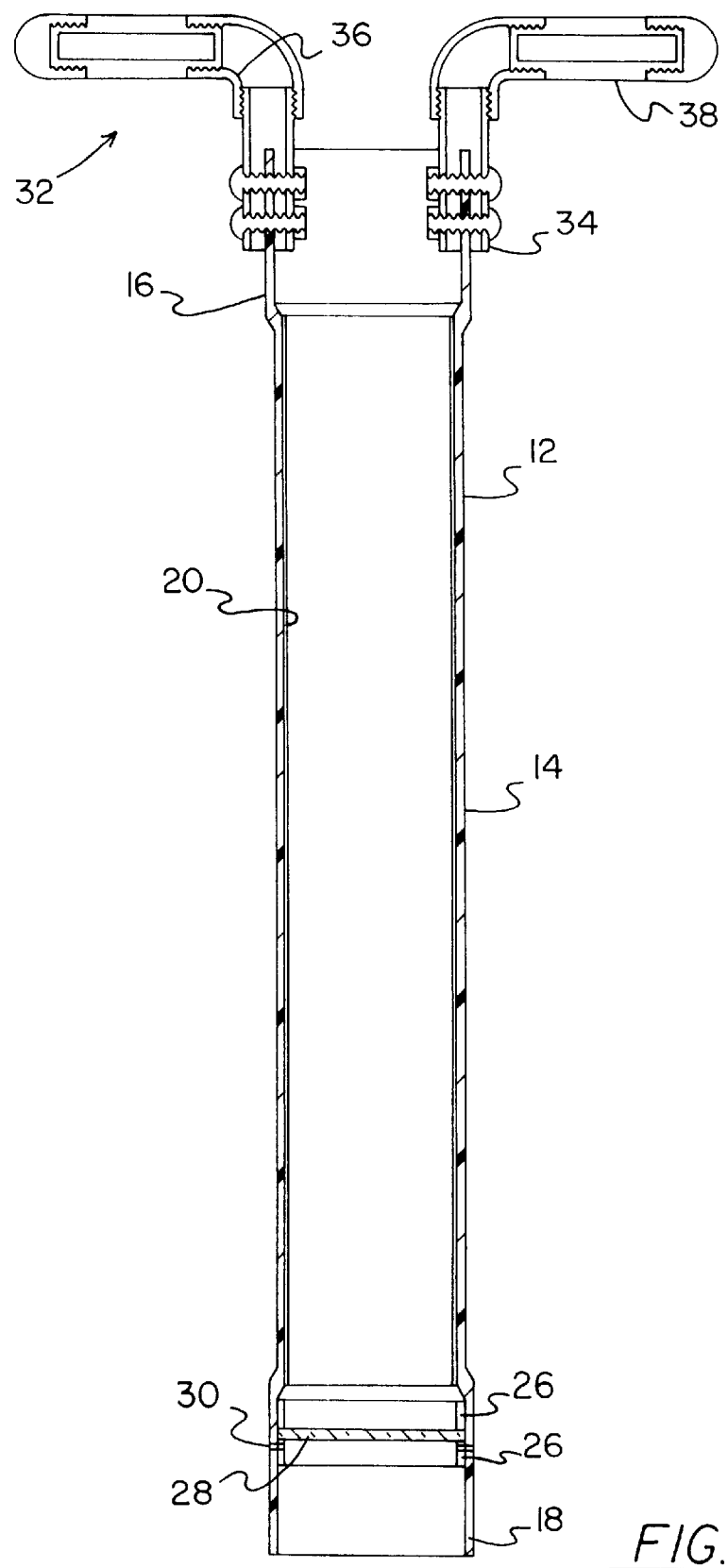
FIG. 3 is a cross-sectional view of the present invention as taken along line 3—3 shown in FIG. 2.

With reference now to the drawings, and in particular to FIGS. 1 through 3 thereof, a new portable underwater viewer with magnifying capabilities embodying the principles and concepts of the present invention and generally designated by the reference numeral 10 will be described.

The present invention, designated as numeral 10, includes a housing 12 with a hollow cylindrical configuration. Ideally, the housing is constructed from PVC plastic. As shown in the figures, the housing has an intermediate extent 14 with a first diameter along a length thereof. Further, the housing is equipped with a top extent 16 and a bottom extent 18 both with a diameter greater than that of the intermediate extent. In the preferred embodiment, the housing has a length of about 30 inches and a diameter of about 4 inches.

For reasons that will soon become apparent, a black lining 20 is situated along an entire inner surface of the housing. A lens assembly is provided including a pair of rings 26 mounted within the inner surface of the bottom extent of the housing in spaced coaxial relationship. The rings are preferably sealed with silicone. A magnifying lens 28 is secured between the rings for magnifying items beneath the housing when viewed through the housing. The black lining prevents glare from interfering with the viewing of items below the housing. It should be understood that a level of magnification of the magnification lens and the various dimensions of the housing may be readily varied per the desires of the user.

For venting air trapped within the bottom extent, a hole 30 is formed in the bottom extent of the housing just beneath the magnifying lens. Finally, a pair of handle assemblies 32 include a pair of vertical posts 34 boltedly coupled to diametrically opposed sides of the top extent of the housing. The handle assemblies further include a pair of elbows 36 each having a bottom portion swivelably secured to an associated one of the vertical posts. A pair of hollow, hermetically sealed horizontal posts 38 are each coupled to a top portion of the corresponding elbow.

By this structure, the horizontal posts are pivotable about an axis associated with the corresponding vertical post. The hollow horizontal posts not only serve as handles, but also as a means of keeping the present invention afloat. As an option, the present invention may be strapped to a back of a user for transportation purposes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An underwater viewing apparatus comprising, in combination:

a housing with a hollow cylindrical configuration including an intermediate extent with a first diameter along a length thereof and a top extent and a bottom extent both with a diameter greater than that of the intermediate extent;

a black lining situated along an entire inner surface of the housing;

a lens assembly including a pair of rings mounted within the inner surface of the bottom extent of the housing in spaced coaxial relationship and a magnifying lens secured therebetween for magnifying items beneath the housing when viewed through the housing;

a hole formed in the bottom extent of the housing just beneath the magnifying lens for venting air trapped within the bottom extent; and a pair of handle assemblies including a pair of vertical posts boltedly coupled to diametrically opposed sides of the top extent of the housing, a pair of elbows each having a bottom portion swivelably secured to an associated one of the vertical posts, and a pair of hollow, hermetically sealed horizontal posts each coupled to a top portion of the corresponding elbow, wherein the horizontal posts are pivotable about an axis associated with the corresponding vertical post.

2. An underwater viewing apparatus comprising:

an elongated housing with a hollow configuration;

a lens assembly including a magnifying lens secured within the housing for magnifying items beneath the housing when viewed through the housing; and a pair of pivotal handle assemblies attached to a top of the housing, each handle assembly including a substantially vertical post, an elbow coupled to the vertical post, and a substantially horizontal post coupled to the elbow, wherein the horizontal post is pivotable about an axis associated with the vertical post.

3. An underwater viewing apparatus as set forth in claim 2 wherein a hole is formed in the housing just beneath the magnifying lens for venting air trapped within a bottom extent of the housing.

4. An underwater viewing apparatus as set forth in claim 2 wherein the housing has a cylindrical configuration.

5. An underwater viewing apparatus as set forth in claim 2 wherein the magnifying lens is constrained by a pair of rings mounted within an inner surface of a bottom extent of the housing in spaced coaxial relationship.

\* \* \* \* \*